United States Patent
Goto et al.

(10) Patent No.: US 9,250,561 B2
(45) Date of Patent: Feb. 2, 2016

(54) IMAGE FORMING APPARATUS AND METHOD FOR ADJUSTING FORMING CONDITION OF IMAGE FORMING APPARATUS

(71) Applicant: Brother Kogyo Kabushiki Kaisha, Nagoya-shi, Aichi-ken (JP)

(72) Inventors: Yuji Goto, Nagoya (JP); Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/667,820

(22) Filed: Mar. 25, 2015

(65) Prior Publication Data

US 2015/0277268 A1  Oct. 1, 2015

(30) Foreign Application Priority Data

Mar. 31, 2014 (JP) .................. 2014-072188

(51) Int. Cl.
  G03G 15/04     (2006.01)
  G03G 15/043    (2006.01)
  G02B 26/12     (2006.01)
  B41J 2/47      (2006.01)

(52) U.S. Cl.
  CPC .............. *G03G 15/043* (2013.01); *B41J 2/473* (2013.01); *G02B 26/123* (2013.01); *G02B 26/127* (2013.01); *G03G 15/04036* (2013.01)

(58) Field of Classification Search
  CPC . G03G 15/04036; G03G 15/043; B41J 2/473; G02B 26/123; G02B 26/127
  See application file for complete search history.

(56) References Cited

U.S. PATENT DOCUMENTS

| | | | | |
|---|---|---|---|---|
| 2008/0088893 | A1* | 4/2008 | Ishida | G06K 15/1219 358/509 |
| 2008/0166140 | A1* | 7/2008 | Noguchi | G03G 15/04 399/15 |
| 2008/0218771 | A1* | 9/2008 | Murayama | B41J 11/007 356/614 |
| 2010/0003044 | A1* | 1/2010 | Burry | G03G 15/161 399/74 |
| 2012/0321356 | A1* | 12/2012 | Sakamoto | G03G 15/0131 399/301 |

FOREIGN PATENT DOCUMENTS

JP  2004-098593 A  4/2004

* cited by examiner

*Primary Examiner* — Ryan Walsh
(74) *Attorney, Agent, or Firm* — Banner & Witcoff, Ltd.

(57) ABSTRACT

A printer forms a first adjustment mark and a second adjustment mark on a belt when execution conditions of inter-light source adjustment or inter-color adjustment processing are established. In the first adjustment mark, a first toner line is positioned at a leading end in the moving direction of the belt, and a second toner line is positioned at a trailing end. In the second adjustment mark, a second toner line is positioned at a leading end, and a first toner line is positioned at a trailing end.

20 Claims, 8 Drawing Sheets

IMAGE FORMING APPARATUS AND METHOD FOR ADJUSTING FORMING CONDITION OF IMAGE FORMING APPARATUS

CROSS-REFERENCE TO RELATED APPLICATION

This application claims priorities from Japanese Patent Application No. 2014-072188 filed on Mar. 31, 2014, the entire subject matter of which is incorporated herein by reference.

TECHNICAL FIELD

The present disclosure relates to an image forming apparatus which has a plurality of light sources corresponding to each developing unit and is capable of forming electrostatic latent images on a photosensitive member with a plurality of light beams respectively emitted from a plurality of light sources.

BACKGROUND

An image forming apparatus which includes a plurality of light sources corresponding to each developing unit, and a multi-beam scanning unit configured to form electrostatic latent images on a photosensitive member with a plurality of light beams respectively emitted from a plurality of light sources has been hitherto known. In this image forming apparatus, the electrostatic latent image forming interval between the light sources which is the interval between the electrostatic latent images formed with a plurality of light beams corresponding to each developing unit may fluctuate due to optical errors, mechanical errors, fluctuations in optical systems with an increase in temperature, or the like, and image quality may be degraded.

Accordingly, an image forming apparatus which has a function of adjusting the electrostatic latent image forming interval between the light sources has been hitherto known (see, for example, JP-A-2004-098593). Specifically, this image forming apparatus causes a multi-beam scanning unit to perform an operation to form so-called solid marks with no gap between scanning lines only with light beams from the same light source for each of a plurality of light sources. The image forming apparatus has a sensor which outputs a signal according to the positions of a plurality of marks formed on a photosensitive member, and adjusts the electrostatic latent image forming interval between the light sources based on the signal from the sensor.

However, in the image forming apparatus of the related art described above, in order to adjust the electrostatic latent image forming interval between the light sources, it is necessary to form solid marks with light beams from the same light source. The fluctuation in the electrostatic latent image forming interval between the light sources may have an influence on processing for adjusting the forming positions of the electrostatic latent images by a plurality of light sources which are the positions of the electrostatic latent images formed with a plurality of light beams from a plurality of light sources. For this reason, there has been demand for improvement.

SUMMARY

The present disclosure has been made in view of the above circumstances, and one of objects of the present disclosure is to provide a technique capable of achieving at least one of adjustment of an electrostatic latent image forming interval between light sources and suppression of an influence of fluctuation in the electrostatic latent image forming interval between the light sources on processing for adjusting the forming positions of electrostatic latent images by a plurality of light sources with a configuration different from the related art.

According to an illustrative embodiment of the present invention, there is provided an image forming apparatus including: at least one photosensitive member; a forming unit which includes at least one developing unit and a multi-beam scanning unit having a first light source and a second light source for each developing unit; a sensor; and a controller. The controller is configured to: execute mark forming processing to control the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and execute adjustment processing to adjust at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

According to another illustrative embodiment of the present invention, there is provided a method for adjusting a forming condition of an image forming apparatus comprising at least one photosensitive member, a forming unit that includes at least one developing unit and a multi-beam scanning unit having a first light source and a second light source for each developing unit, a sensor, and a controller. The method includes: a mark forming step to control the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and an adjustment step to adjust at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

According to still another illustrative embodiment of the present invention, there is provided a non-transitory computer-readable storage medium storing instruction to control an image forming apparatus, the image forming apparatus including at least one photosensitive member, a forming unit that includes at least one developing unit and a multi-beam scanning unit having a first light source and a second light source corresponding to each developing unit, a sensor, and a controller. The instructions causes the image forming apparatus to perform: a mark forming processing for controlling the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and an adjustment processing for adjusting at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

DETAILED DESCRIPTION

Figure 1:
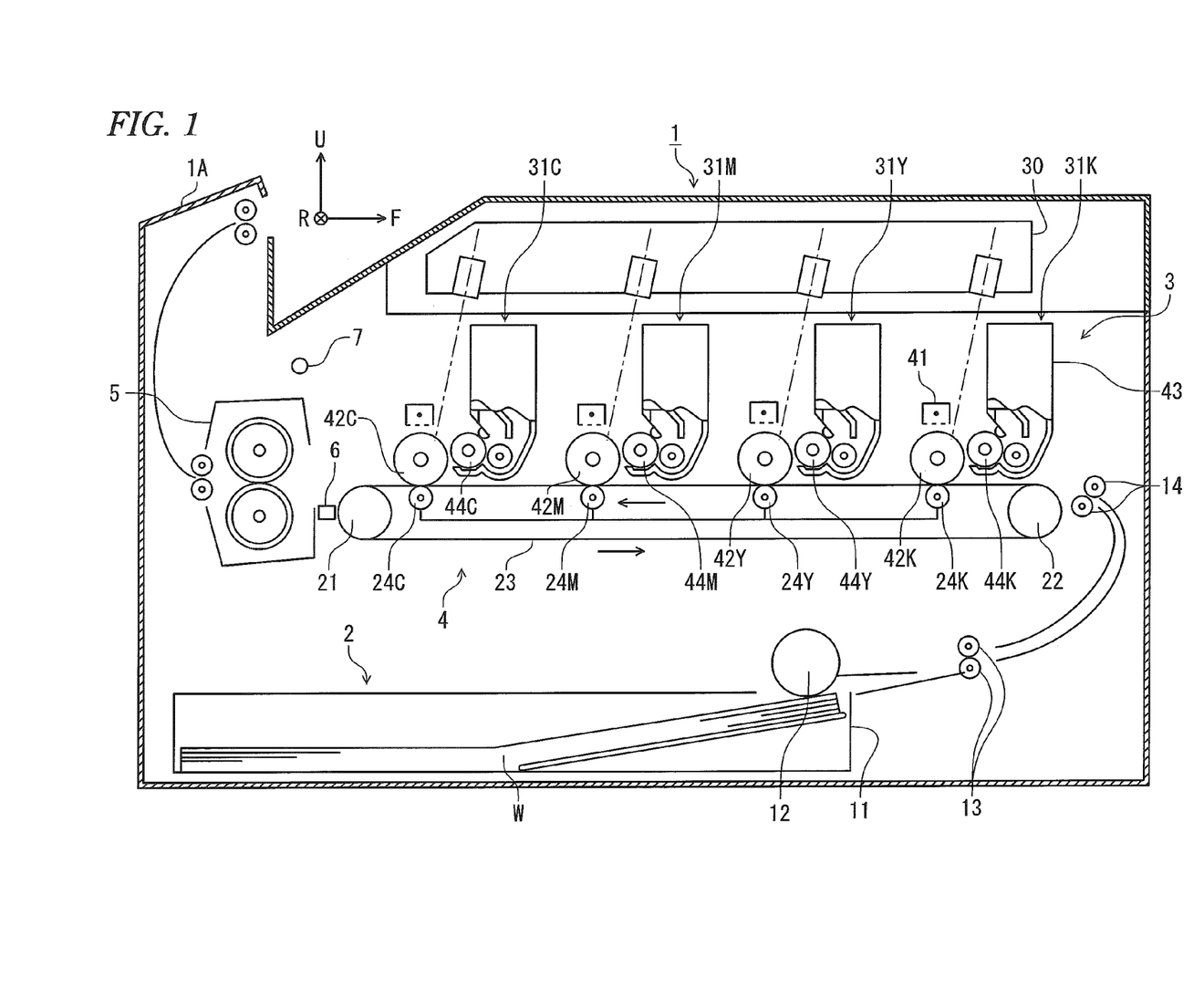
FIG. 1 is a schematic view showing the mechanical configuration of a printer according to an embodiment of the present disclosure.

A printer 1 according to an embodiment of the present disclosure will be described referring to FIGS. 1 to 6. In the following description, the right side on the sheet of FIG. 1 is referred to as the front side F of the printer 1, the deep side on the sheet is referred to as the right side R of the printer 1, and the upper side on the sheet is referred to as the upper side U of the printer 1. The printer 1 is, for example, a direct transfer tandem type color laser printer which can form a color image using toner of four colors of black, yellow, magenta, and cyan. The printer 1 is an example of an image forming apparatus. In the following description, when there is a distinction among components of the printer 1 or terms for each color, K (black), Y (yellow), M (magenta), and C (cyan) meaning the respective colors are attached to the ends of reference numerals of the components and the like. In FIG. 1, reference numerals of the same components among the respective colors are appropriately omitted.

The printer 1 is provided with, inside a body case 1A, a feed unit 2, an image forming unit 3, a conveying mechanism 4, a fixing unit 5, and a mark sensor 6.

The feed unit 2 has a tray 11 which is provided in the lowest part of the printer 1 and can store a plurality of sheets W, a pickup roller 12, conveying rollers 13, and registration rollers 14. The sheets W stored in the tray 11 are taken one by one by the pickup roller 12, and are fed to the conveying mechanism 4 through the conveying rollers 13 and the registration rollers 14.

The conveying mechanism 4 has a configuration in which a belt 23 is stretched between a driving roller 21 and a driven roller 22. If the driving roller 21 rotates, the surface of the belt 23 opposed to a photosensitive drum 42 moves backward, and the sheet W fed from the registration rollers 14 is conveyed from the image forming unit 3 to the fixing unit 5. Inside the belt 23, four transfer rollers 24K to 24C described below are arranged in the conveying direction of the sheet W, that is, in the front-back direction.

The image forming unit 3 has an exposure unit 30 and four processing units 31K to 31C. The image forming unit 3 and the fixing unit 5 are an example of a forming unit.

Figure 2:
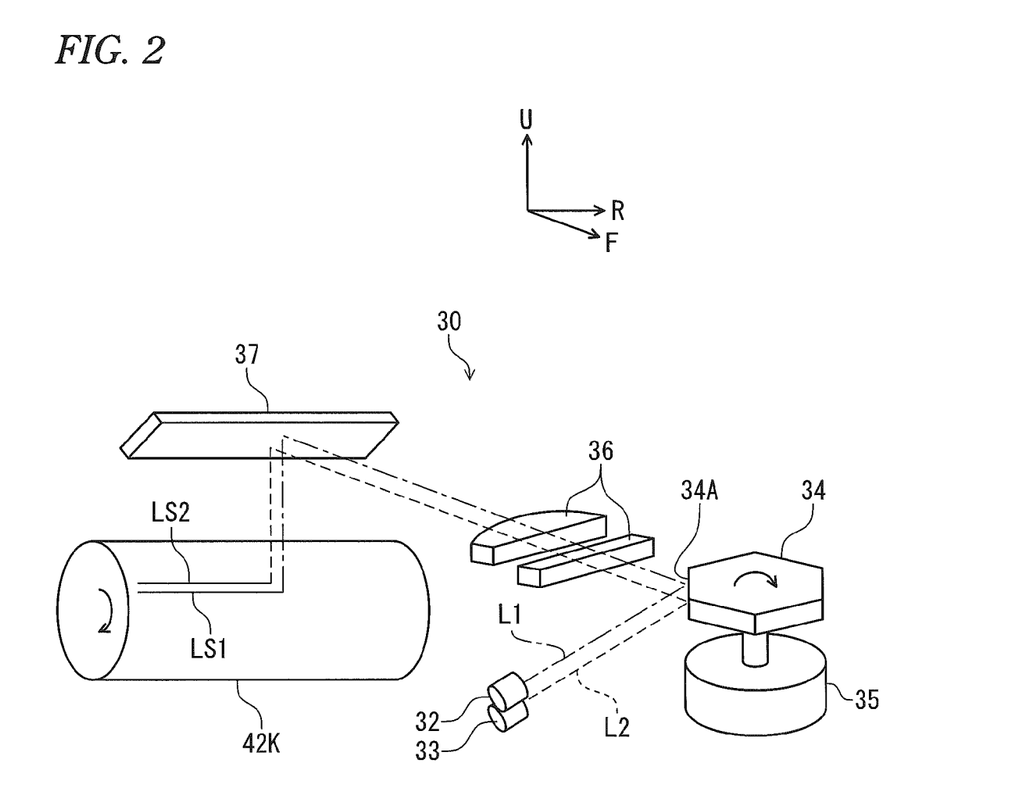
FIG. 2 is a schematic view showing a configuration of an exposure unit.

The exposure unit 30 is an example of a multi-beam scanning unit, and has two light sources for each color to form two scanning lines simultaneously on the photosensitive drum 42 of each color by two light beams respectively emitted from the two light sources. As shown in FIG. 2, the exposure unit 30 has a first light source 32, a second light source 33, a polygon mirror 34, a polygon motor 35, a lens 36, and a reflection mirror 37. Four sets of the first light source 32 and the second light source 33 are provided corresponding to developing rollers 44 of four colors described below.

FIG. 2 illustrates a configuration for exposing a photosensitive drum 42K of black. The polygon mirror 34 is an example of a rotating polygon mirror, and is rotationally driven by the polygon motor 35 to reflect and deflect a light beam L1 from the first light source 32 and a light beam L2 from the second light source 33 by a reflection surface 34A. The photosensitive drum 42K is irradiated with the deflected light beams L1 and L2 through the lens 36 and the reflection mirror 37.

The first light source 32 and the second light source 33 are, for example, laser diodes, and are arranged such that the photosensitive drum 42K is irradiated with the light beams L1 and L2 in a sub scanning direction, in other words, in the rotation direction of the photosensitive drum 42K at an interval. The exposure unit 30 causes at least one of the first light source 32 and the second light source 33 to emit light according to image data corresponding to a print instruction described below, and forms scanning lines on the surface of the photosensitive drum 42K to form an electrostatic latent image. In the drawing, reference numeral LS1 represents a first scanning line formed with the light beam L1, and reference numeral LS2 represents a second scanning line formed with the light beam L2.

The four processing units 31K to 31C are arranged in the conveying direction, that is, in the front-back direction. Hereinafter, the four processing units 31K to 31C have the same configuration except for the color of toner, and a specific configuration will be described with the processing unit 31K corresponding to black as an example.

The processing unit 31K has the transfer roller 24K, a charger 41, a photosensitive drum 42K, a toner box 43, and a developing roller 44K. The photosensitive drum 42K is an example of a photosensitive member, and the developing roller 44K is an example of a developing unit.

The charger 41 charges the surface of the photosensitive drum 42K uniformly. The developing roller 44K supplies toner in the toner box 43 onto the photosensitive drum 42K, develops the electrostatic latent image formed by the exposure unit 30, and forms a toner image of black on the photosensitive drum 42K. The transfer roller 24K is arranged to be opposed to the photosensitive drum 42K through the belt 23 and transfers the toner image formed on the photosensitive drum 42K to the sheet W.

The sheet W with the toner images of the respective colors transferred thereto is conveyed to the fixing unit 5 by the conveying mechanism 4 and is discharged on the top surface of the printer 1 after the toner images are heated and fixed by the fixing unit 5.

The mark sensor 6 is an example of a sensor, is provided on the back side of the belt 23, and outputs a detection signal according to the positions of marks 61 formed on the belt 23, or image density. Specifically, the mark sensor 6 is an optical sensor having a light projection section 6A which emits light toward a detection position E set on the belt 23, and a light reception section 6B which receives reflected light from the detection position E (see FIG. 5). Hereinafter, it is assumed that the mark sensor 6 outputs a detection signal having a higher signal level as the light reception amount is larger. It is assumed that the belt 23 has light reflectance higher than toner, and when no mark is inside a detection area E, the light reception amount of the mark sensor 6 is larger than when a mark is inside the detection area E. It is assumed that the detection area E has a width for a plurality of toner lines described below.

Figure 3:
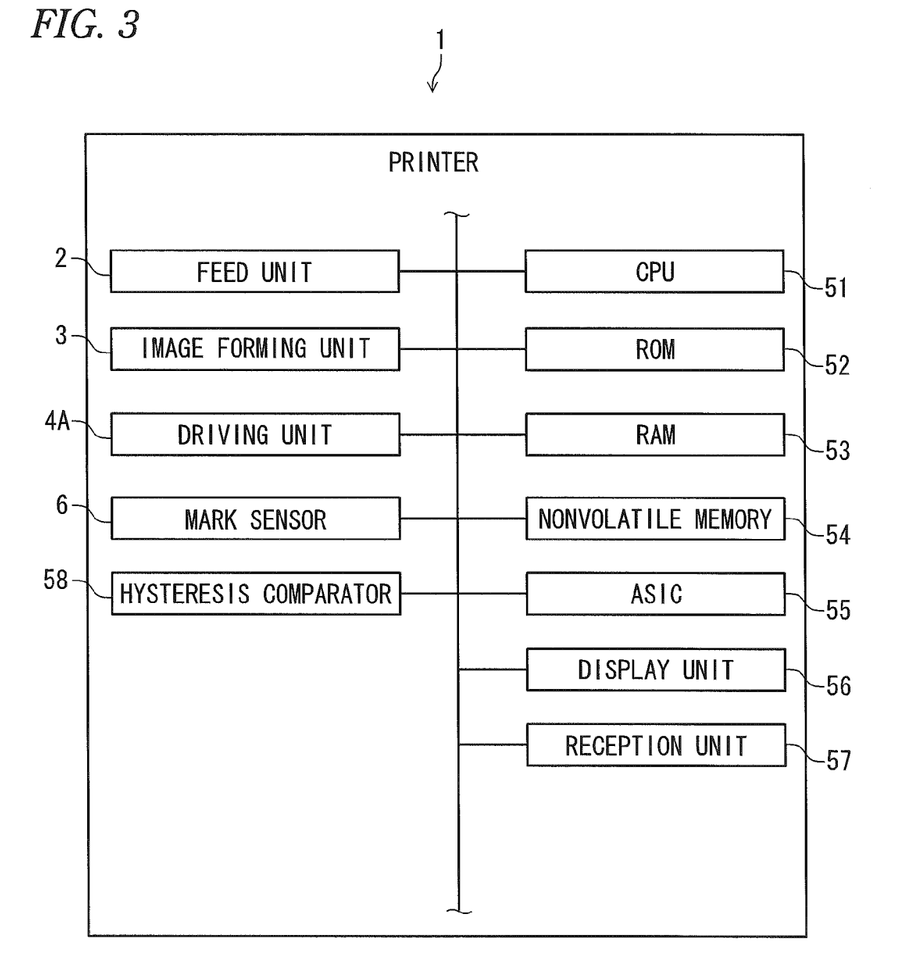
FIG. 3 is a block diagram showing an electrical configuration of the printer.

As shown in FIG. 3, the printer 1 has a driving unit 4A, a central processing unit (hereinafter, referred to as CPU) 51, a ROM 52, a RAM 53, a nonvolatile memory 54, an application specific integrated circuit (ASIC) 55, a display unit 56, a reception unit 57, and a hysteresis comparator 58, in addition to the feed unit 2 and the like.

The driving unit 4A serves to rotate the photosensitive drum 42 and the conveying mechanism 4, and is configured to be capable of changing the rotation speed of the photosensitive drum 42 and the conveying speed of the conveying mechanism 4 under the control of the CPU 51.

The ROM 52 stores various programs, and various programs include, for example, a program for executing control processing described below or a program for controlling the operation of the respective units of the printer 1. The RAM 53 is used as a work area when the CPU 51 executes various programs or a temporary storage area of data. The nonvolatile memory 54 may be a rewritable memory, such as an NVRAM, a flash memory, an HDD, or an EEPROM.

The CPU 51 is an example of a controller. The CPU 51 controls the respective units of the printer 1 according to a program read from the ROM 52. The ASIC 55 is, for example, a hardware circuit configured exclusively for image processing. The display unit 56 has a liquid crystal display, a lamp, or the like and can display various setting screens, the operation state of the apparatus, or the like. The reception unit 57 has a plurality of buttons and is a user interface which receives various input instructions from the user, a communication unit which performs communication with an external apparatus (not shown) by a wireless communication system or a wired communication system, or the like.

The hysteresis comparator 58 compares the level of the detection signal from the mark sensor 6 with a first threshold value TH1 and a second threshold value TH2, and outputs a binary signal according to the comparison result. It is assumed that the first threshold value TH1 is smaller than the second threshold value TH2. The CPU 51 executes respective kinds of adjustment processing described below based on the binary signal from the hysteresis comparator 58.

The CPU 51 executes inter-light source adjustment processing and inter-color adjustment processing.

The inter-light source adjustment processing is processing for adjusting electrostatic latent image forming conditions such that the electrostatic latent image forming interval between the light sources which is the interval between the electrostatic latent images formed on the photosensitive drum 42 by the first light source 32 and the second light source 33 becomes a specified interval for each color. In this case, the forming conditions include, for example, the exposure start timing of each light source when a light beam of at least one of the first light source 32 and the second light source 33 is written to the photosensitive drum 42, the magnification of the optical system of the exposure unit 30, the rotation speed of the photosensitive drum 42, and the like. A light source adjustment value for adjusting the forming conditions is stored in, for example, the nonvolatile memory 54. The execution condition of the inter-light source adjustment is, for example, that the number of printed sheets W after the execution of previous inter-light source adjustment processing reaches a first specified number of sheets. The fluctuation in the electrostatic latent image forming interval between the light sources includes fluctuation in a main scanning direction and fluctuation in sub scanning direction.

The inter-color adjustment processing is processing for adjusting electrostatic latent image forming conditions such that the mutual shift of the forming positions of the toner images of the respective colors on the sheet W, called a color shift, is eliminated. In this case, the forming conditions include, for example, the time difference between the timing when the exposure unit 30 starts to expose the photosensitive drum 42 of a reference color and the timing when the exposure unit 30 starts to expose the photosensitive drum 42 of an adjustment color, and the like. Hereinafter, the reference color is black, and the adjustment color is yellow, magenta, or cyan. An inter-color adjustment value for adjusting the forming conditions is stored in, for example, the nonvolatile memory 54. The execution condition of inter-color adjustment is, for example, that the number of printed sheets W after the execution of previous inter-color adjustment processing reaches a second specified number of sheets smaller than the first specified number of sheets. The color shift includes a shift in the main scanning direction and a shift in the sub scanning direction.

Figure 5:
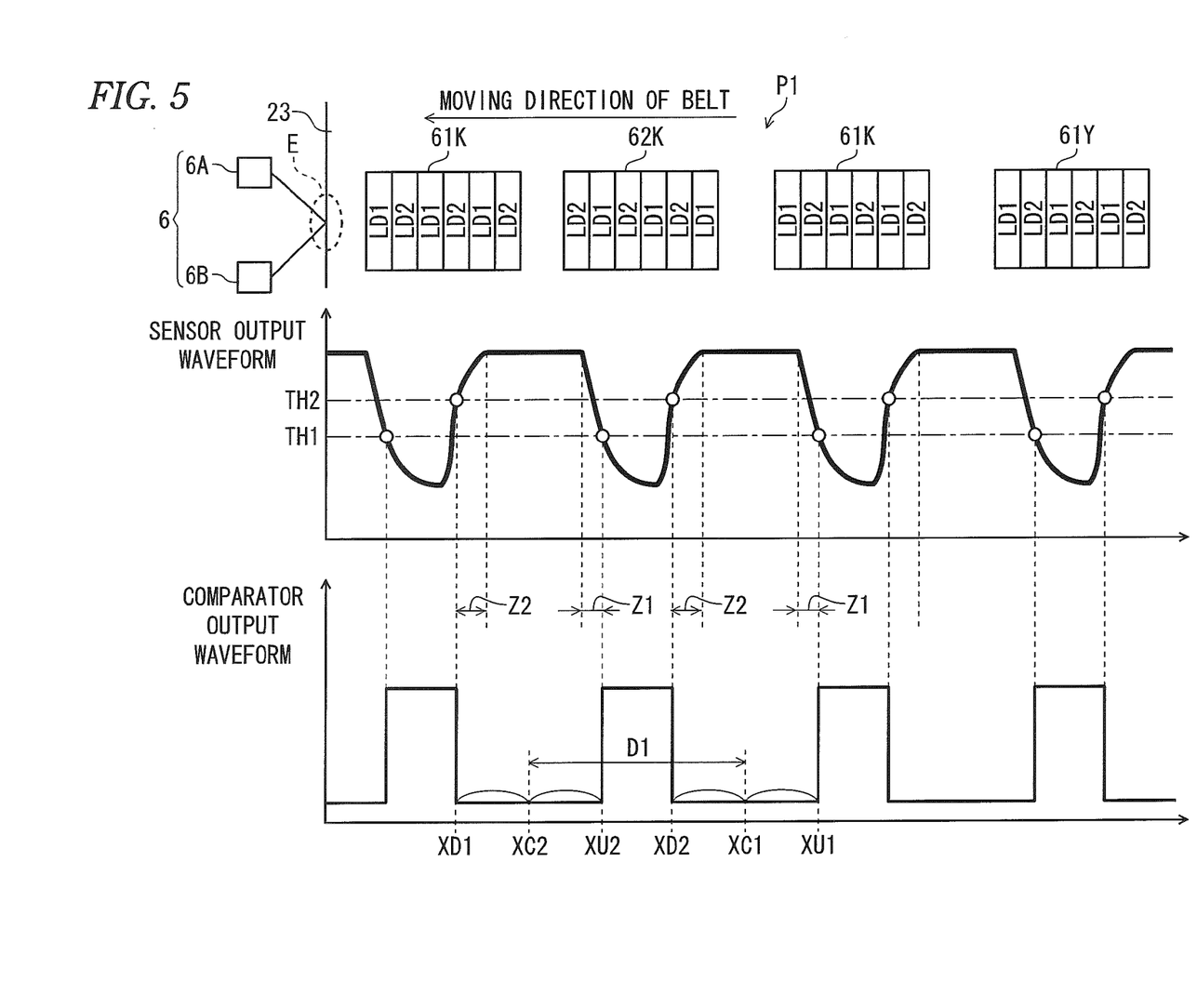
FIG. 5 is a diagram showing an example of an arrangement of a mark sensor and an inter-light source adjustment pattern.
Figure 6:
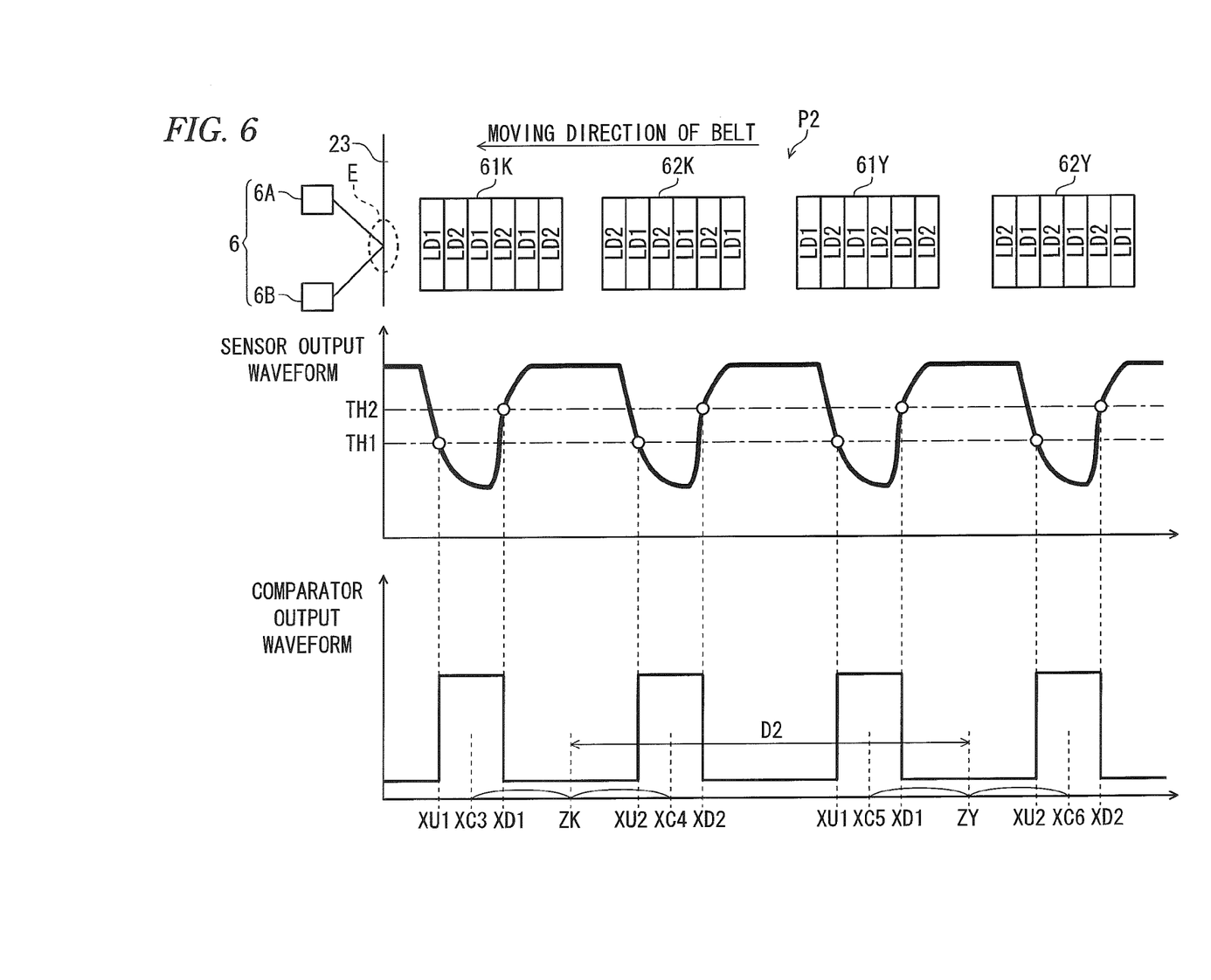
FIG. 6 is a diagram showing an example of an inter-color adjustment pattern.

Details of control executed by the CPU 51 will be described referring to FIGS. 4 to 6. FIGS. 5 and 6 illustrate patterns P1 and P2 described below, lines attached with characters of LD1 represent first toner lines where the first scanning line LS1 is developed, and lines attached with characters of LD2 represent second toner lines where the second scanning line LS2 is developed.

Figure 4:
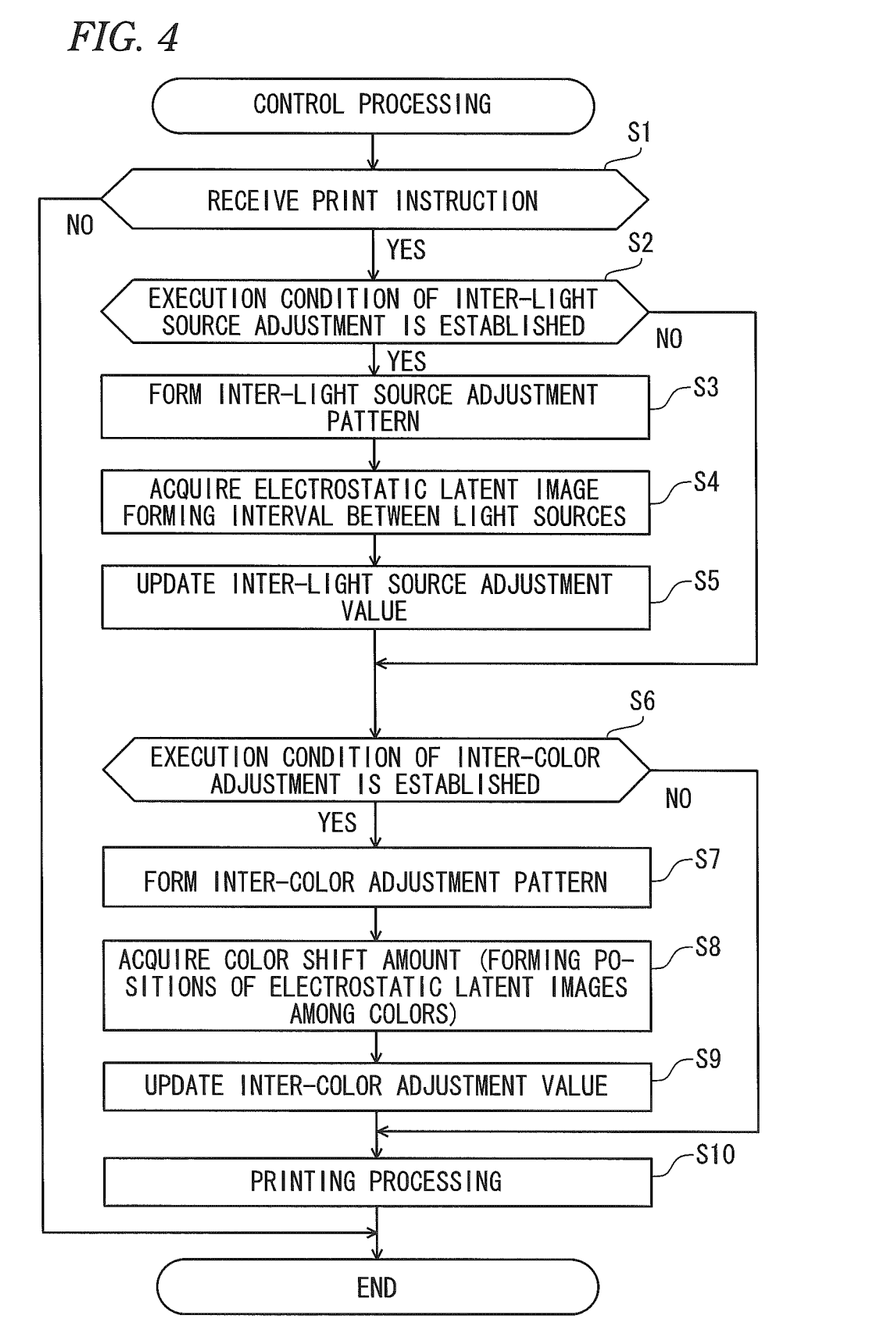
FIG. 4 is a flowchart showing control processing.

For example, when the printer 1 is powered on, the CPU 51 repeatedly executes control processing shown in FIG. 4 at a predetermined time interval. In S1 of FIG. 4, the CPU 51 first determines whether or not the reception unit 57 receives a print instruction, if it is determined that the print instruction is not received (S1: NO), ends this control processing, and starts the control processing again after a predetermined time.

If it is determined that the print instruction is received (S1: YES), the CPU 51 determines whether or not the execution conditions of inter-light source adjustment are established (S2). If it is determined that the execution conditions of inter-light source adjustment are established (S2: YES), the CPU 51 executes the inter-light source adjustment processing (S3 to S5).

In S3, the CPU 51 controls the driving unit 4A to rotate the photosensitive drum 42, the conveying mechanism 4, and the like, and causes the image forming unit 3 to form an inter-light source adjustment pattern P1 on the belt 23. The processing of S3 is an example of mark forming processing and a mark forming process. Specifically, the CPU 51 adjusts the forming conditions based on the last adjustment values stored in the nonvolatile memory 54, and then causes the image forming unit 3 to form the inter-light source adjustment pattern P1.

In S3, the rotation speed of the photosensitive drum 42 or the like is faster than half the speed during printing processing on the sheet W described below (S10 of FIG. 4), and hereinafter, it is assumed that the rotation speed of the photosensitive drum 42 or the like is equal to the speed during the printing processing on the sheet W or the like. Here, as in the configuration of the related art, when forming so-called solid marks in which a plurality of toner lines are arranged with no interval, since it is necessary to make the rotation speed of the photosensitive drum 42 or the like half or less the speed during the printing processing on the sheet W, the mark forming time may be increased. In contrast, since adjustment marks 61 and 62 described below can be formed in a state where the rotation speed of the photosensitive drum 42 or the like is equal to the speed during the printing processing on the sheet W, it is possible to suppress an increase in mark forming time.

As shown in FIG. 5, in the inter-light source adjustment pattern P1, mark groups of the respective colors are arranged in the sub scanning direction. In the mark group of each color, two first adjustment marks 61 and one second adjustment mark 62 are arranged in the sub scanning direction, and the second adjustment mark 62 is positioned between the two first adjustment marks 61. In the inter-light source adjustment pattern P1, the first adjustment mark 61 and the second adjustment mark 62 are alternately arranged as a whole, and the total number of all marks 61 and 62 is an odd number. With this, it is possible to suppress wasteful forming of marks which are not used in inter-light source adjustment, compared to a case where the total number is an even number. In FIG. 5, only adjustment marks 61K and 62K of black and an adjustment mark 61Y of yellow are shown.

Each of the adjustment marks 61 and 62 has a rectangular shape. The first adjustment mark 61 is an example of a first mark, a first toner line LD1 and a second toner line LD2 are alternately arranged in the moving direction of the belt 23, the first toner line LD1 is positioned at the leading end in the moving direction of the belt 23, and the second toner line LD2 is positioned at the trailing end. The first toner line LD1 and the second toner line LD2 may not be alternately arranged between the first toner line LD1 at the leading end and the second toner line LD2 at the trailing end, and for example, the first toner lines LD1 may be arranged successively. The moving direction of the belt 23 is an example of one direction along the sub scanning direction, and hereinafter, it is assumed that the leading end, the trailing end, the front side, and the rear side mean the leading end, the trailing end, the front side, and the rear side in the moving direction of the belt 23.

The second adjustment mark 62 is an example of a second mark, a first toner line LD1 and a second toner line LD2 are alternately arranged in the moving direction of the belt 23, the second toner line LD2 is positioned at the leading end, and the first toner line LD1 is positioned at the trailing end. The first toner line LD1 and the second toner line LD2 may not be alternately arranged between the second toner line LD2 at the leading end and the first toner line LD1 at the trailing end, and for example, the second toner lines LD2 may be arranged successively.

The exposure unit 30 forms the electrostatic latent images of the adjustment marks 61 and 62 on the photosensitive drum 42 with two light beams L1 and L2 respectively emitted from the first light source 32 and the second light source 33 for each color. The exposure unit 30 forms the first adjustment mark 61 and the second adjustment mark 62 on the photosensitive drum 42 in the same phase in the rotation cycle of the photosensitive drum 42 for each color. For example, the exposure unit 30 forms the first adjustment mark 61 at a predetermined position on the photosensitive drum 42, and thereafter, when the photosensitive drum 42 rotates once and has a phase advanced by 360 degrees, forms the second adjustment mark 62 at the predetermined position. For example, when there are a plurality of phases at the same rotation speed in the rotation cycle of the photosensitive drum 42, such as a half period, the first adjustment mark 61 may be formed in one phase among these phases, and second adjustment mark 62 may be formed in another phase, whereby both marks 61 and 62 may be formed at different positions on the photosensitive drum 42. With this, it is possible to suppress degradation of the accuracy of inter-light source adjustment due to rotation irregularity of the photosensitive drum 42.

After the inter-light source adjustment pattern P1 starts to be formed, the CPU 51 acquires the electrostatic latent image forming interval between the light sources based on the binary signal output from the hysteresis comparator 58 according to the leading end and the trailing end of each of the adjustment marks 61 and 62 for each color (S4). Hereinafter, the adjustment marks 61K and 62K of black shown in FIG. 5 will be described as an example.

As shown in FIG. 5, the level of the detection signal from the mark sensor 6 falls when the leading end of each of the adjustment marks 61K and 62K passes through the detection area E, and when the level of the detection signal falls below the first threshold value TH1, the binary signal is inverted from a low level to a high level. The level of the detection signal rises when the trailing end of each of the adjustment marks 61K and 62K passes through the detection area E, and when the level of the detection signal exceeds the second threshold value TH2, the level of the binary signal is inverted from the high level to the low level.

The CPU 51 detects a rising position XU corresponding to the timing when the binary signal is inverted from the low level to the high level as the position of the leading end of each of the adjustment marks 61K and 62K, and detects a falling position XD corresponding to the timing when the binary signal is inverted from the high level to the low level as the position of the trailing end of each of the adjustment marks 61K and 62K. The CPU 51 determines a first position XC1 by the position of the trailing end of the second adjustment mark 62K and the position of the leading end of the first adjustment mark 61 positioned on the rear side. The first toner line LD1 is positioned at both of the trailing end of the second adjustment mark 62K and the leading end of the first adjustment mark 61 positioned on the rear side. Specifically, the CPU 51 obtains the central position of a falling position XD2 corresponding to the second adjustment mark 62K and a rising position XU1 corresponding to the first adjustment mark 61K on the rear side, and sets the position as the first position XC1.

The CPU 51 determines a second position XC2 by the position of the leading end of the second adjustment mark 62K and the position of the trailing end of the first adjustment mark 61K positioned on the front side. The second toner line LD2 is positioned at both of the leading end of the second adjustment mark 62K and the trailing end of the first adjustment mark 61K on the front side. Specifically, the CPU 51 obtains a central position of a rising position XU2 corresponding to the second adjustment mark 62K and a falling position XD1 corresponding to the first adjustment mark 61K on the front side, and sets the position as the second position XC2.

As will be apparent from FIG. 5, since the first position XC1 is determined by the positions of the first toner lines LD1, the first position XC1 is displaced according to the position of the electrostatic latent image formed with the light beam L1 from the first light source 32. Since the second position XC2 is determined by the positions of the second toner lines LD2, the second position XC2 is displaced according to the position of the electrostatic latent image formed with the light beam L2 from the second light source 33. Accordingly, the interval D1 between the first position XC1 and the second position XC2 changes according to the electrostatic latent image forming interval between the light sources in the sub scanning direction. For this reason, the CPU 51 can acquire the electrostatic latent image forming interval between the light sources in the sub scanning direction based on the interval D1 for each color. In addition, since the leading and trailing ends which respectively determine the first position and the second position are close to each other compared to an embodiment of FIG. 7 described below, it is possible to adjust the electrostatic latent image forming interval between the light sources with high accuracy.

The influence of hysteresis of the hysteresis comparator 58 may cause the difference between a shift amount Z1 of the rising position XU with respect to the actual position of the leading end of each of the adjustment marks 61K and 62K and a shift amount Z2 of the falling position XD with respect to the actual position of the trailing end of each of the adjustment marks 61K and 62K. Accordingly, the difference in shift amount due to hysteresis may have an influence on the acquisition accuracy of the electrostatic latent image forming interval between the light sources.

However, according to the acquisition method of the electrostatic latent image forming interval between the light sources described above, it is possible to suppress the influence of the difference in shift amount. That is, since both of the first position XC1 and the second position XC2 are determined by one rising position XU and one falling position XD, the first position XC1 and the second position XC2 are equally influenced by the difference in shift amount. Since the interval D1 is the difference between the first position XC1 and the second position XC2, the influence of the difference in shift amount is cancelled. Accordingly, the influence of the difference in shift amount on the acquisition accuracy of the electrostatic latent image forming interval between the light sources is suppressed.

If the electrostatic latent image forming interval between the light sources is acquired, the CPU 51 calculates a light source adjustment value so as to allow the electrostatic latent image forming interval between the light sources to become a specified interval for each color, updates the light source adjustment value of each color stored in the nonvolatile memory 54 to the calculated value (S5), and progresses to S6. The processing of S4 and S5 is an example of adjustment processing and an adjustment process. In S2, if it is determined that the execution conditions of inter-light source adjustment are not established (S2: NO), the CPU 51 does not perform the processing of S3 to 55, and progresses to S6.

In S6, the CPU 51 determines whether or not the execution conditions of inter-color adjustment are established. If it is determined that the execution conditions of inter-color adjustment are established (S6: YES), the CPU 51 executes the inter-color adjustment processing (S7 to S9).

In S7, the CPU 51 controls the driving unit 4A to rotate the photosensitive drum 42 and the like and causes the image forming unit 3 to form an inter-color adjustment pattern P2 on the belt 23. The processing of S7 is an example of mark forming processing and a mark forming process. Specifically, the CPU 51 adjusts the image forming conditions based on the last adjustment values stored in the nonvolatile memory 54 and then causes the image forming unit 3 to form the inter-color adjustment pattern P2. In S7, similarly to the processing of S3, the rotation speed of the photosensitive drum 42 or the like is equal to the speed during the printing processing on the sheet W, and the exposure unit 30 forms the first adjustment mark 61 and the second adjustment mark 62 on the photosensitive drum 42 in the same phase in the rotation cycle of the photosensitive drum 42 for each color.

As shown in FIG. 6, in the inter-color adjustment pattern P2, one set or a plurality of sets of mark groups of the respective colors are arranged in the sub scanning direction. In the mark group of each color, one first adjustment mark 61 and one second adjustment mark 62 are arranged in the sub scanning direction. In the inter-color adjustment pattern P2, the first adjustment mark 61 and the second adjustment mark 62 are alternately arranged as a whole, and the total number of all marks 61 and 62 is an odd number. With this, it is possible to suppress wasteful forming of marks which are not used in the inter-color adjustment processing, compared to a case where the total number is an even number. In FIG. 6, only adjustment marks 61K, 61Y, 62K, and 62Y of black and yellow are shown.

After the inter-color adjustment pattern P2 starts to be formed, the CPU 51 acquires a color shift amount based on the binary signal output from the hysteresis comparator 58 according to the leading end and the trailing end of each of the adjustment marks 61 and 62 for each adjustment color (S8). Hereinafter, the adjustment marks 61K, 61Y, 62K, and 62Y of black and yellow shown in FIG. 6 will be described as an example.

The CPU 51 determines a position ZK of black based on the positions of the leading and trailing ends of each of the first adjustment mark 61K and the second adjustment mark 62K. Specifically, the CPU 51 obtains a central position XC3 of a rising position XU1 and a falling position XD1 corresponding to the first adjustment mark 61K. The CPU 51 obtains a central position XC4 of a rising position XU2 and a falling position XD2 corresponding to the second adjustment mark 62K. The CPU 51 sets a central position of the position XC3 and the position XC4 as the position ZK of black.

The CPU 51 determines a position ZY of yellow based on the positions of the leading and trailing ends of each of the first adjustment mark 61Y and the second adjustment mark 62Y. Specifically, the CPU 51 obtains a central position XC5 of a rising position XU1 and a falling position XD1 corresponding to the first adjustment mark 61Y. The CPU 51 obtains a central position XC6 of a rising position XU2 and a falling position XD2 corresponding to the second adjustment mark 62Y. The CPU 51 sets a central position of the position XC5 and the position XC6 as the position ZY of yellow.

The CPU 51 obtains the interval D2 between the position ZK of black and the position ZY of yellow. The interval D2 changes according to a color shift amount in the sub scanning direction of yellow with respect to black. For this reason, the CPU 51 can acquire a color shift amount in the sub scanning direction based on the interval D2 for each adjustment color.

With the use of the adjustment marks 61 and 62, it is possible to perform inter-color adjustment while suppressing the influence of fluctuation in the electrostatic latent image forming interval between the light sources. That is, as will be apparent from FIG. 6, the position ZK of black and the position ZY of yellow are respectively determined based on the first adjustment mark 61K and the second adjustment mark 62 in which the toner lines LD1 and LD2 positioned at the leading end and the trailing end are replaced with each other.

The interval D2 is the difference between the position ZK of black and the position ZY of yellow, and means the relative positions of the first adjustment mark 61K and the second adjustment mark 62. Accordingly, even if there is a shift in electrostatic latent image forming interval between the light sources, the shift in electrostatic latent image forming interval between the light sources is cancelled at the interval D2. For this reason, it is possible to suppress the influence of fluctuation in the electrostatic latent image forming interval between the light sources on inter-color adjustment. This is particularly effective when the inter-light source adjustment processing is not performed (S2 of FIG. 4: NO), and inter-color adjustment is performed (S6: YES).

According to the above-described method of inter-color adjustment, it is possible to suppress the influence of the difference in shift amount due to hysteresis. That is, all of the positions XC3 to XC6 are determined by one rising position XU and one falling position XD, the positions XC3 to XC6 are equally influenced by the difference in shift amount. Since the positions ZK and ZY of black and yellow are the values which are determined by the relative relationship between the positions XC3 and XC5 and the positions XC4 and XC6, the influence of the difference in shift amount is cancelled. Accordingly, the influence of the difference in shift amount on inter-color adjustment is suppressed.

If the color shift amount is acquired, the CPU 51 calculates an inter-color adjustment value so as to eliminate the color shift amount for each adjustment color, updates the inter-color adjustment value of each adjustment color stored in the nonvolatile memory 54 to the calculated value (S9), and progresses to S10. The processing of S8 and S9 is an example of adjustment processing and an adjustment process. In S6, if it is determined that the execution conditions of inter-color adjustment are not established (S6: NO), the CPU 51 does not perform the processing of S7 to S9, and progresses to S10.

In S10, the CPU 51 performs the printing processing on the sheet W based on image data of the print instruction, and ends this control processing. The processing of S10 is an example of sheet forming processing. Specifically, the CPU 51 adjusts the image forming conditions based on the last adjustment values stored in the nonvolatile memory 54, then, causes the exposure unit 30 to form the electrostatic latent image on the photosensitive drum 42 by the two light beams L1 and L2 respectively emitted from the first light source 32 and the second light source 33 for each color, and causes the developing roller 44 to develop the electrostatic latent image and to transfer the electrostatic latent image to the sheet W.

Figure 7:
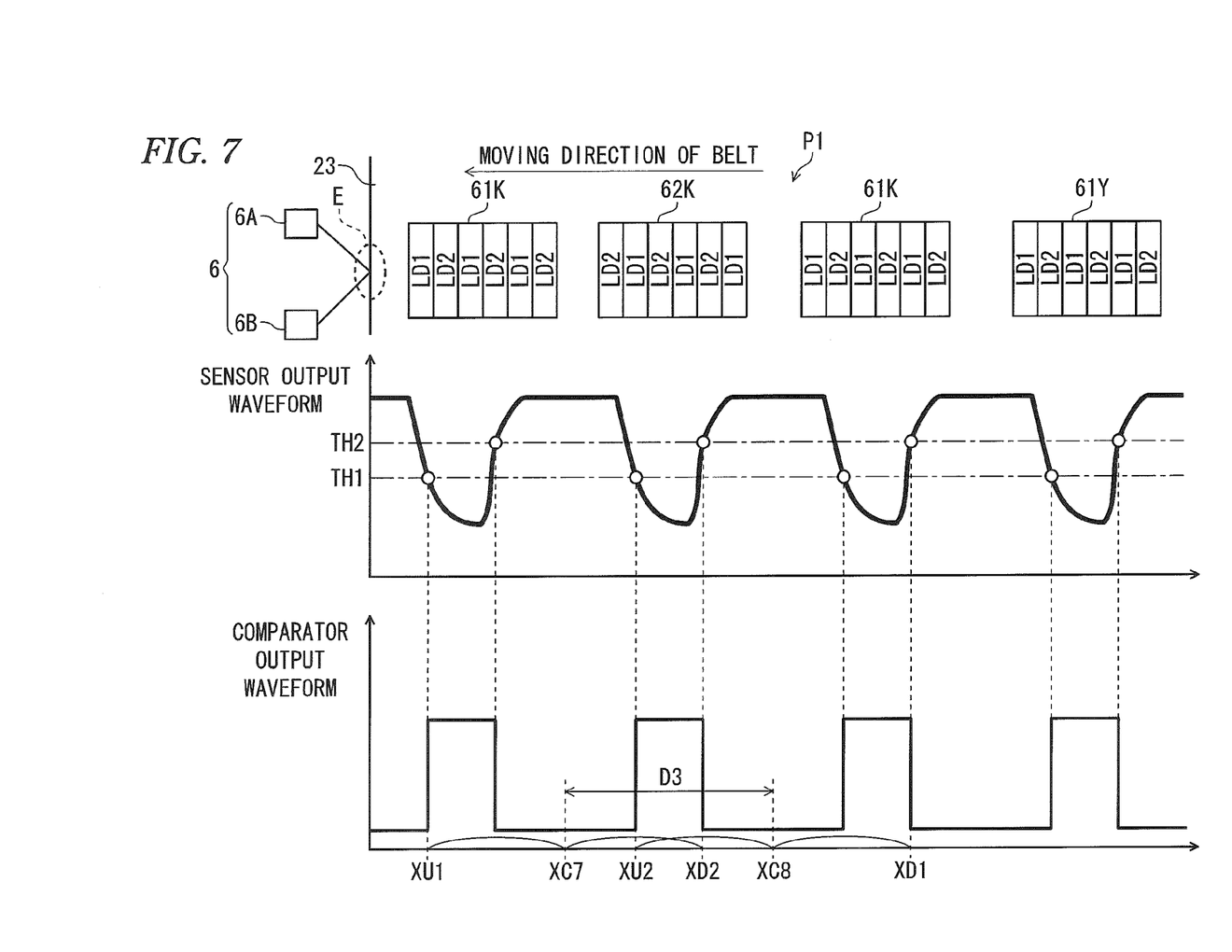
FIG. 7 is a diagram showing an example of an inter-light source adjustment pattern of another embodiment.

FIG. 7 shows another embodiment according to the present disclosure. The difference from the above-described embodiment is the acquisition method of the electrostatic latent image forming interval between the light sources in S4 of FIG. 4, and other points are the same as the above-described embodiment. Accordingly, the common parts to the above-described embodiment are represented by the same reference numerals, overlapping description will be omitted, and only different parts will be described below.

As shown in FIG. 7, the CPU 51 determines a first position XC7 by the position of the trailing end of the second adjustment mark 62K and the position of the leading end of the first adjustment mark 61 positioned on the front side. The first toner line LD1 is positioned at both of the trailing end of the second adjustment mark 62K and the leading end of the first adjustment mark 61 positioned on the front side. Specifically, the CPU 51 obtains a central position of a falling position XD2 corresponding to the second adjustment mark 62K and a rising position XU1 corresponding to the first adjustment mark 61K on the front side, and sets the position as the first position XC7.

The CPU 51 determines a second position XC8 by the position of the second toner line LD2 at the leading end of the second adjustment mark 62K and the position of the second toner line LD2 at the trailing end of the first adjustment mark 61K positioned at the rear side. The second toner line LD2 is positioned at both of the leading end of the second adjustment mark 62K and the trailing end of the first adjustment mark 61K positioned at the rear side. Specifically, the CPU 51 obtains a central position of a rising position XU2 corresponding to the second adjustment mark 62K and a falling position XD1 corresponding to the first adjustment mark 61K on the rear side, and sets the position as the second position XC8.

The interval D3 between the first position XC7 and the second position XC8 changes according to the electrostatic latent image forming interval between the light sources in the sub scanning direction. For this reason, the CPU 51 can acquire the electrostatic latent image forming interval between the light sources in the sub scanning direction based on the interval D3 for each color. Since both of the first position XC7 and the second position XC8 are determined by one rising position XU and one falling position XD, as in the embodiment of FIG. 5, the influence of the difference in shift amount due to hysteresis on the acquisition accuracy of the electrostatic latent image forming interval between the light sources is suppressed.

Figure 8:
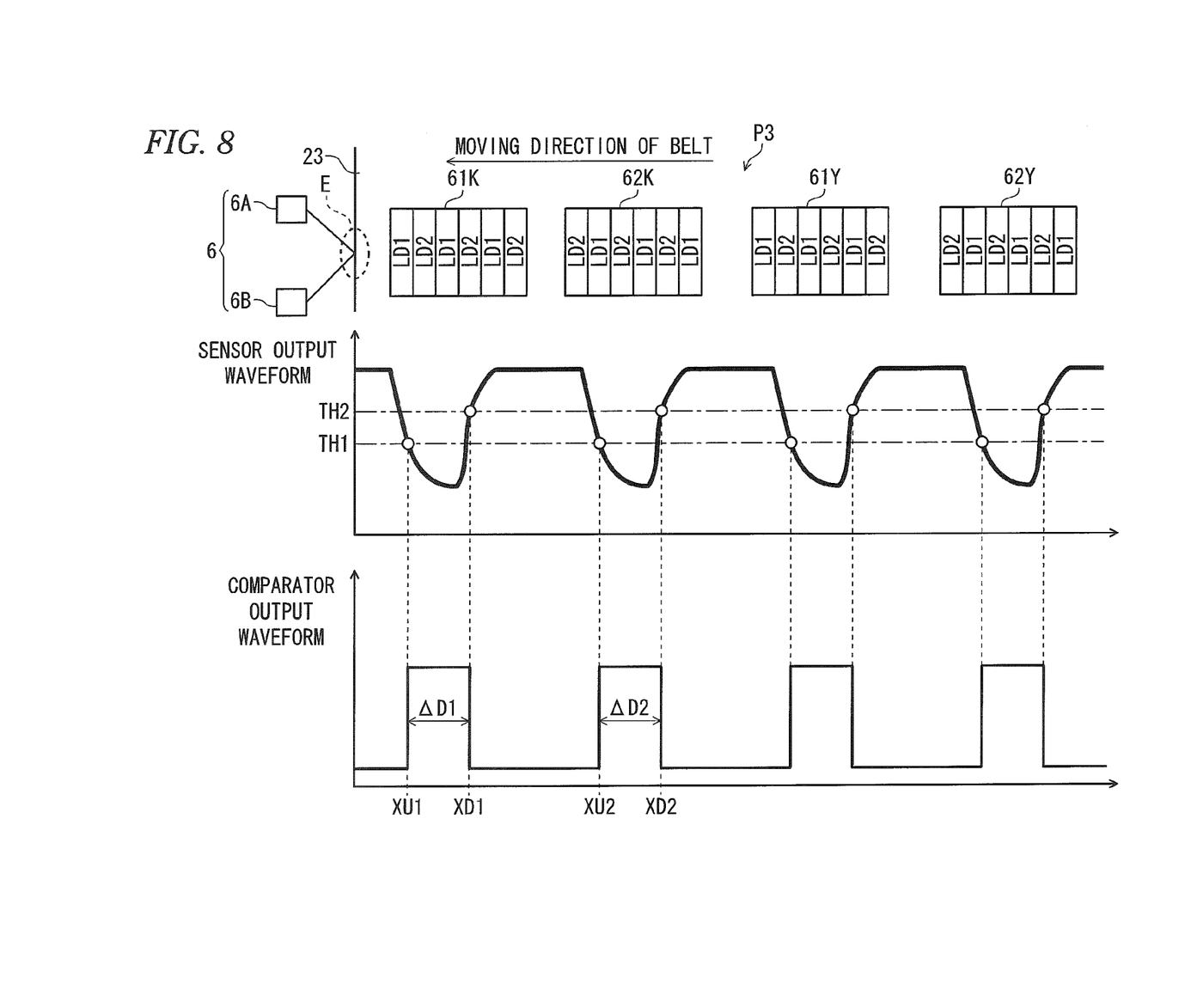
FIG. 8 is a diagram showing an example of an inter-light source adjustment pattern of another embodiment according to the present disclosure.

FIG. 8 shows another embodiment according to the present disclosure. The difference from the above-described embodiment is the pattern formed in S3 of FIG. 4 and the acquisition method of the electrostatic latent image forming interval between the light sources in S4, and other points are the same as the above-described embodiment. Accordingly, the common parts to the above-described embodiment are represented by the same reference numerals, overlapping description will be omitted, and only different parts will be described below.

In S3 of FIG. 4, the CPU 51 causes the image forming unit 3 to form an inter-light source adjustment pattern P3 on the belt 23. As shown in FIG. 8, the inter-light source adjustment pattern P3 has the same mark arrangement patterns as the inter-color adjustment pattern P2 of FIG. 6.

In S4 of FIG. 4, the CPU 51 determines a first mark width ΔD1 from the leading end to the trailing end of the first adjustment mark 61K. Specifically, the CPU 51 sets the difference between the rising position XU1 and the falling position XD1 corresponding to the first adjustment mark 61K as the first mark width ΔD 1. The CPU 51 determines a second mark width ΔD2 from the leading end to the trailing end of the second adjustment mark 62K. Specifically, the CPU 51 sets the difference between the rising position XU2 and the falling position XD2 corresponding to the second adjustment mark 62K as the second mark width ΔD2.

Here, in FIG. 8, if the second toner line LD2 is shifted in a direction away from the first toner line LD1, the first mark width ΔD 1 is widened and the second mark width ΔD2 is narrowed. On the contrary, if the second toner line LD2 is shifted in a direction approaching the first toner line LD1, the first mark width AD 1 is narrowed and the second mark width ΔD2 is widened. That is, the difference between the first mark width ΔD1 and the second mark width ΔD2 changes according to the electrostatic latent image forming interval between the light sources in the sub scanning direction.

For this reason, the CPU 51 can acquire the electrostatic latent image forming interval between the light sources in the sub scanning direction based on the first mark width ΔD1 and the second mark width ΔD2 for each color. Since both of the first mark width ΔD1 and the second mark width ΔD2 are determined by one rising position XU and one falling position XD, as in the embodiment of FIG. 5, the difference in shift amount due to hysteresis on the acquisition accuracy of the electrostatic latent image forming interval between the light sources is suppressed.

According to this embodiment, it is possible to acquire the electrostatic latent image forming interval between the light sources based on one first adjustment mark 61 and one second adjustment mark 62 for each color. Since the inter-light source adjustment pattern P3 has the same mark arrangement pattern as the inter-color adjustment pattern P2, in the inter-color adjustment processing, it is possible to use the inter-light source adjustment pattern P3 as the inter-color adjustment pattern.

The technique disclosed in the present disclosure is not limited to the embodiment described above and illustrated in the drawings. The following embodiments are also included in the scope of the present disclosure.

An "image forming apparatus" is not limited to a direct transfer tandem type color laser printer, and for example, may be other types of image forming apparatuses, such as an intermediate transfer type and a four-cycle type. The image forming apparatus may be a monochrome-dedicated image forming apparatus as well as a color image forming apparatus. The image forming apparatus may be a single printer, a copying machine, a facsimile machine, or a multi function device.

A "multi-beam scanning unit" has three or more light sources, and may have a configuration in which three or more scanning lines can be formed on a photosensitive member simultaneously by light beams respectively emitted from the three or more light sources. In the foregoing embodiment, although the exposure unit 30 has a configuration in which one polygon mirror 34 is used for the four colors, the polygon mirror 34 may be provided for each color.

A "sensor" is not limited to the mark sensor 6, and for example, may be a sensor which outputs a detection signal according to an electrostatic latent image or a toner image of a mark formed on the photosensitive drum 42.

The printer 1 may include a comparator which compares a detection signal with one threshold value, without including a hysteresis comparator.

A "controller" has a configuration in which the respective kinds of processing of FIG. 4 are executed by the single CPU 51. However, the present disclosure is not limited thereto, and the controller may have a configuration in which the respective kinds of processing of FIG. 4 are executed by a plurality of CPUs, a configuration in which the respective kinds of processing of FIG. 4 are executed only by a dedicated hardware circuit, such as the ASIC 55, or a configuration in which the respective kinds of processing of FIG. 4 are executed by a CPU and a hardware circuit.

Each of the adjustment marks 61 and 62 may be made of a pair of bar marks, and may have a shape in which at least one of the bar marks is inclined at a predetermined angle with respect to the main scanning direction. With this shape, it is possible to perform inter-light source adjustment or inter-color adjustment in the main scanning direction as well as the sub scanning direction. The positions of the adjustment marks 61 and 62 may not be arranged in the sub scanning direction. For example, if the printer 1 has a configuration in which a plurality of mark sensors 6 are arranged in the main scanning direction, the positions of the adjustment marks 61 and 62 may be shifted in the main scanning direction.

When it is determined that the execution conditions of both of inter-light source adjustment and inter-color adjustment are established, the CPU 51 may execute the inter-color adjustment processing using the adjustment marks 61 and 62 of the inter-light source adjustment pattern P1 without forming the inter-color adjustment pattern P2. For example, the CPU 51 may acquire the color shift amount of the adjustment color based on the leading and trailing ends of one of the two first adjustment marks 61 and the second adjustment mark 62 in the mark group for each color.

The CPU 51 may execute either the inter-light source adjustment processing or the inter-color adjustment processing. The CPU 51 may perform one of the inter-light source adjustment processing and the inter-color adjustment processing by a known adjustment method other than the above-described method.

In the inter-color adjustment processing of FIG. 6, for example, the CPU 51 may obtain the first interval between the leading end of the first adjustment mark 61K of black and the leading end of the first adjustment mark 61Y of yellow, may determine the second interval between the leading end of the second adjustment mark 62K of black and the leading end of the second adjustment mark 62Y of yellow, and may acquire a color shift amount from the average value of the first interval and the second interval. The CPU 51 may obtain the third interval between the trailing end of the first adjustment mark 61K of black and the trailing end of the first adjustment mark 61Y of yellow, may determine the fourth interval between the trailing end of the second adjustment mark 62K of black and the trailing end of the second adjustment mark 62Y of yellow, and may acquire a color shift amount from the average value of the third interval and the fourth interval. After the execution of the inter-light source adjustment, the color shift amount of each adjustment color may be acquired by one of the first adjustment mark 61 and the second adjustment mark 62.

What is claimed is:

1. An image forming apparatus comprising:
   at least one photosensitive member;
   a forming unit comprising at least one developing unit and a multi-beam scanning unit having a first light source and a second light source for each developing unit;
   a sensor; and
   a controller configured to:
   execute mark forming processing to control the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and
   execute adjustment processing to adjust at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

2. The image forming apparatus according to claim 1, wherein the controller adjusts, in the adjustment processing, the electrostatic latent image forming interval between the light sources based on a distance between a first position determined by the leading end of the first mark and the trailing end of the second mark and a second position determined by the trailing end of the first mark and the leading end of the second mark.

3. The image forming apparatus according to claim 2, wherein the controller forms the second mark between two of the first marks in one direction in the mark forming processing,
wherein the first position is a position which is determined by the trailing end of the second mark and the leading end of the first mark positioned after the second mark in the one direction, and
wherein the second position is a position which is determined by the leading end of the second mark and the trailing end of the first mark positioned ahead of the second mark in the one direction.

4. The image forming apparatus according to claim 2, wherein, in the mark forming processing, the controller alternately forms the first mark and the second mark in the one direction, and the total number of first marks and second marks to be formed is an odd number.

5. The image forming apparatus according to claim 2 further comprising:
a hysteresis comparator,
wherein the signal in the adjustment processing is a signal output from the sensor through the hysteresis comparator.

6. The image forming apparatus according to claim 1, wherein, in the adjustment processing, the controller adjusts the electrostatic latent image forming interval between the light sources based on a difference between a first mark width from the leading end to the trailing end of the first mark and a second mark width from the leading end to the trailing end of the second mark.

7. The image forming apparatus according to claim 1, wherein the photosensitive member is a rotating body that rotates around a rotation axis along a main scanning direction, and
wherein, in the mark forming processing, the controller controls the forming unit to form the first mark and the second mark on the photosensitive member in the same phase in a rotation cycle of the photosensitive member.

8. The image forming apparatus according to claim 1, wherein the forming unit comprises a plurality of developing units which accommodate toner of different colors,
wherein a plurality of photosensitive members are provided corresponding to the plurality of developing units, and
wherein the controller executes inter-color adjustment processing to control the forming unit to form, for each of the plurality of developing units and photosensitive members, one of the first mark and the second mark and to adjust relative forming positions of the electrostatic latent images among the colors based on a signal output from the sensor according to the one of the first mark and the second mark.

9. The image forming apparatus according to claim 1, wherein the photosensitive member is a rotating body that rotates around a rotation axis along a main scanning direction,
wherein the controller executes sheet forming processing to control the forming unit to form, on the photosensitive member, electrostatic latent images to be transferred to a sheet with two light beams from the first light source and the second light source, and
wherein, in the mark forming processing, the controller controls the photosensitive member to rotate at the same speed as the speed at the time of the execution of the sheet forming processing to form the first mark and the second mark.

10. The image forming apparatus according to claim 1, wherein the forming unit comprises a plurality of developing units which accommodate toner of different colors,
wherein a plurality of photosensitive members are provided corresponding to the plurality of developing units,
wherein, in the mark forming processing, the controller controls the forming unit to form the first mark and the second mark for each of the plurality of developing units and photosensitive members, and
wherein, in the adjustment processing, the controller adjusts the forming positions of the electrostatic latent images among the colors based on relative positions of the first mark and the second mark among the colors.

11. A method for adjusting a forming condition of an image forming apparatus comprising at least one photosensitive member, a forming unit that comprises at least one developing unit and a multi-beam scanning unit having a first light source and a second light source for each developing unit, a sensor, and a controller, the method comprising:
a mark forming step to control the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and
an adjustment step to adjust at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

12. The method according to claim 11 further comprising:
adjusting, in the adjustment processing, the electrostatic latent image forming interval between the light sources based on a distance between a first position determined by the leading end of the first mark and the trailing end of the second mark and a second position determined by the trailing end of the first mark and the leading end of the second mark.

13. The method according to claim 12, wherein the second mark is formed between two of the first marks in one direction in the mark forming processing, wherein the first position is a position which is determined by the trailing end of the second mark and the leading end of the first mark positioned after the second mark in the one direction, and wherein the second position is a position which is determined by the leading end of the second mark and the trailing end of the first mark positioned ahead of the second mark in the one direction.

14. The method according to claim 12, wherein, in the mark forming processing, the first mark and the second mark are alternately formed in the one direction, and the total number of first marks and second marks to be formed is an odd number.

15. The method according to claim 12, wherein the image forming apparatus further comprises a hysteresis comparator, wherein the signal in the adjustment processing is a signal output from the sensor through the hysteresis comparator.

16. A non-transitory computer-readable storage medium storing instruction to control an image forming apparatus, the image forming apparatus comprising at least one photosensitive member, a forming unit that comprises at least one developing unit and a multi-beam scanning unit having a first light source and a second light source corresponding to each developing unit, a sensor, and a controller, the instructions causing the image forming apparatus to perform:

a mark forming processing for controlling the forming unit to form a first mark and a second mark on the photosensitive member, the first mark having the leading end of which in one direction along a sub scanning direction is formed with a light beam from the first light source and the trailing end of which is formed with a light beam from the second light source, and the second mark having the leading end of which in one direction is formed with a light beam from the second light source and the trailing end of which is formed with a light beam from the first light source; and an adjustment processing for adjusting at least one of an electrostatic latent image forming interval between the light sources, which is an interval between electrostatic latent images formed on the photosensitive member by the first light source and the second light source, and forming positions of electrostatic latent images by a plurality of light sources, which are positions of electrostatic latent images formed with light beams from the first light source and the second light source, based on a signal output from the sensor according to positions of the leading and trailing ends of the first mark and the leading and trailing ends of the second mark.

17. The non-transitory computer-readable storage medium according to claim 16, wherein the instructions further causes the image forming apparatus to perform:

adjusting, in the adjustment processing, the electrostatic latent image forming interval between the light sources based on a distance between a first position determined by the leading end of the first mark and the trailing end of the second mark and a second position determined by the trailing end of the first mark and the leading end of the second mark.

18. The non-transitory computer-readable storage medium according to claim 17, wherein the second mark is formed between two of the first marks in one direction in the mark forming processing, wherein the first position is a position which is determined by the trailing end of the second mark and the leading end of the first mark positioned after the second mark in the one direction, and wherein the second position is a position which is determined by the leading end of the second mark and the trailing end of the first mark positioned ahead of the second mark in the one direction.

19. The non-transitory computer-readable storage medium according to claim 17, wherein, in the mark forming processing, the first mark and the second mark are alternately formed in the one direction, and the total number of first marks and second marks to be formed is an odd number.

20. The non-transitory computer-readable storage medium according to claim 17, wherein the image forming apparatus further comprises a hysteresis comparator, wherein the signal in the adjustment processing is a signal output from the sensor through the hysteresis comparator.

* * * * *